United States Patent
Talbot et al.

(10) Patent No.: US 11,636,588 B2
(45) Date of Patent: Apr. 25, 2023

(54) APPARATUS AND SYSTEM FOR ASSESSING PADDY RICE GRAINS

(71) Applicant: Ricegrowers Limited, Leeton (AU)

(72) Inventors: Mark Jeffrey Talbot, Leeton (AU); Trevor Ian Peacock, Leeton (AU)

(73) Assignee: Ricegrowers Limited, Leeton (AU)

( * ) Notice: Subject to any disclaimer, the term of this patent is extended or adjusted under 35 U.S.C. 154(b) by 54 days.

(21) Appl. No.: 17/461,192

(22) Filed: Aug. 30, 2021

(65) Prior Publication Data
US 2022/0067903 A1 Mar. 3, 2022

(30) Foreign Application Priority Data
Aug. 31, 2020 (AU) ................................ 2020903107

(51) Int. Cl.
*G06T 7/00* (2017.01)
*G06T 7/13* (2017.01)
(Continued)

(52) U.S. Cl.
CPC ......... *G06T 7/001* (2013.01); *G01N 21/8851* (2013.01); *G01N 21/95* (2013.01); *G06T 7/13* (2017.01); *G06T 7/136* (2017.01); *G06T 7/90* (2017.01); *H04N 23/74* (2023.01); *G01N 2201/061* (2013.01); *G06T 2207/10152* (2013.01); *G06T 2207/30128* (2013.01)

(58) Field of Classification Search
CPC .... G01N 21/85; G01N 21/8851; G01N 21/95; G01N 2201/061; G06T 2207/10016; G06T 2207/10152; G06T 2207/30128; G06T 7/001; G06T 7/13; G06T 7/136; G06T 7/62; G06T 7/90; H04N 5/2256; H04N 5/23229; H04N 5/2354; H04N 23/56; H04N 23/74; H04N 23/80

USPC ........................................................ 348/89
See application file for complete search history.

(56) References Cited

U.S. PATENT DOCUMENTS

| | | | | |
|---|---|---|---|---|
| 5,917,927 A | * | 6/1999 | Satake | G01N 21/85 382/110 |
| 2003/0048927 A1 | * | 3/2003 | Sato | G01N 21/85 382/110 |

FOREIGN PATENT DOCUMENTS

| | | |
|---|---|---|
| JP | H0875657 A | 3/1996 |
| JP | 2003254911 A | 9/2003 |
| | (Continued) | |

OTHER PUBLICATIONS

Machine translation of JP 2014052355 A (Year: 2014).*

*Primary Examiner* — Christopher S Kelley
*Assistant Examiner* — Ana Picon-Feliciano
(74) *Attorney, Agent, or Firm* — Bookoff McAndrews, PLLC

(57) ABSTRACT

Apparatus for assessing paddy rice grains including: a light source; a camera secured in a fixed position spaced from the light source; and a grain tray mountable between the light source and the camera. The grain tray defines openings dimensioned to receive the paddy rice grains. The light source is operable in a first mode to illuminate one end of at least some of the openings, and operable in a second mode to illuminate the opposed end of the at least some of the openings. The camera is operable to capture a first image of the at least some of the openings simultaneously with the light source being operated in the first mode, and a second image of the at least some of the openings simultaneously with the light source being operated in the second mode.

16 Claims, 10 Drawing Sheets

(51) Int. Cl.
  *G06T 7/136* (2017.01)
  *G01N 21/88* (2006.01)
  *G01N 21/95* (2006.01)
  *G06T 7/90* (2017.01)
  *H04N 23/74* (2023.01)

(56) References Cited

FOREIGN PATENT DOCUMENTS

| | | | |
|---|---:|---|---:|
| JP | 3642106 | B2 | 4/2005 |
| JP | 2008302314 | A | 12/2008 |
| JP | 5332268 | B2 | 11/2013 |
| JP | 201452355 | A | 3/2014 |
| JP | 2014052355 | A * | 3/2014 |

\* cited by examiner

APPARATUS AND SYSTEM FOR ASSESSING PADDY RICE GRAINS

CROSS-REFERENCE TO RELATED APPLICATIONS

This patent application claims the benefit under 35 U.S.C. § 119 to Australian Patent Application No. 2020903107, filed on Aug. 31, 2020, the entirety of which is incorporated herein by reference.

TECHNICAL FIELD

The present disclosure relates generally to apparatus and systems for assessing milling quality of paddy rice grains.

BACKGROUND

Estimating whole grain yield of a harvested crop is important in rice agriculture. Whole grain yield (WGY) of a paddy sample is calculated as the percentage of whole grains (measured by weight) present in the sample after milling, which involves de-hulling to remove the grain hull, and polishing to remove the bran layer, relative to the original paddy sample weight. A whole grain is defined as a grain having a length equal to or greater than 75% of a defined average whole grain length for a specific grain variety. In milling practice, WGY is determined after removing broken grains with an indent cylinder. The WGY of a harvested crop will determine the content of the crop which is saleable and consequently affect the value of the harvest.

Soon after harvesting, field paddy is received by a grain handling depot. At this stage, each paddy grain comprises a rice grain covered by the bran layer and contained within the hull, and has a moisture content ranging between 11-22%, depending on the environment in which the grain was grown and when the grain was harvested. Determining WGY of paddy received at a depot typically involves extracting a sample bag of the paddy from a particular delivery, transporting the sample to a laboratory to be stored and dried until it is ready to be milled, milling the paddy to remove the hull and bran layers, and removing broken grains with an indent cylinder. This may also involve manually inspecting the rice to determine grain quality. This process requires months and is prone to human error.

Few attempts to automate estimating WGY of a rice grain sample are known. One example is the "PaddyCheck" instrument, developed by Perten Instruments. This measures the physical properties and translucency of rice kernels to allow estimating head rice yield (HRY), which is a comparable measure to WGY. Measurements are obtained by the destructive testing of grains using a mechanical probe to measure breaking force, in addition to assessing colour and light transmission of grains captured in images. However, as this instrument is calibrated on dried rice, typically having a moisture content of around 12%, the instrument can produce inaccurate results when testing paddy which generally has a much higher moisture content and consequently different physical properties.

Any discussion of documents, acts, materials, devices, articles or the like which has been included in the present specification is not to be taken as an admission that any or all of these matters were common general knowledge in the field relevant to the present disclosure as it existed before the priority date of each of the appended claims.

SUMMARY

According to at least one disclosed embodiment, there is provided an apparatus for assessing paddy rice grains. The apparatus includes: a light source; a camera secured in a fixed position; and a grain tray mountable between the light source and the camera. The grain tray defines a plurality of elongate openings, each opening defining opposed ends and being dimensioned to receive a paddy grain between the ends. The light source is operable in a first mode to illuminate one end of at least some of the openings of the grain tray, and operable in a second mode to illuminate the opposed end of the at least some of the openings, where in each mode the light source transmits light through the at least some of the openings and towards the camera. The camera is operable to capture a first image of the at least some of the openings simultaneously with the light source being operated in the first mode, and a second image of the at least some of the openings simultaneously with the light source being operated in the second mode.

The light source may include an array of light emitting units configured to be alternately operated in two groups, and the grain tray be configured to be secured relative to the array such that each opening is aligned with one light emitting unit of the first group and one light emitting unit of the second group.

The grain tray may define opposed sides, and each opening be a recess defined in one of the sides, and the grain tray may further define a plurality of light tunnels arranged in pairs, each pair associated with one of the recesses and arranged to extend from the associated recess to the other side of the grain tray.

Each recess may define a base surface extending between the ends, and the associated light tunnels be defined in the base surface.

Each light tunnel may be arranged adjacent to and spaced from one of the ends of the associated recess.

Each light tunnel may define a bend adjacent the base surface.

The camera may be secured operatively above the light source.

The apparatus may include a second light source arranged proximally to the camera to allow illuminating the grain tray.

In one embodiment, there is provided a tray for receiving a plurality of paddy grains, the tray having opposed sides and defining a plurality of recesses in one of the sides, each recess defining opposed ends and dimensioned to receive a paddy grain between the ends, and further defining a plurality of light tunnels arranged in pairs, each pair associated with one of the recesses and arranged to extend from the ends of the associated recess to the other side of the tray.

In a further embodiment, there is provided a system for assessing paddy rice grains, the system including: a tray configured to support the paddy grains; a light source arranged to transmit light through the paddy grains supported by the tray, the light source operable in a first mode to cause light to be transmitted through the grains in a first direction, and operable in a second mode to cause light to be transmitted through the grains in a second direction opposite to the first direction; a camera secured relative to the light source to allow capturing images of the paddy grains supported by the tray, the camera operable to capture a first image of the paddy grains simultaneously with the light source being operated in the first mode, and a second image of the paddy grains simultaneously with the light source being operated in the second mode; and a processor communicatively coupled with the camera, and configured such that, responsive to receiving the first image and the second image, the processor is configured to identify a crack defined by any of the paddy grains represented in the first image and the second image.

The processor may be configured such that identifying a crack includes detecting edges defined by at least one of the first image and the second image, and determining if the edge relates to a crack.

The processor may be configured such that determining if the edge relates to a crack includes the processor determining if the edge defines a property which exceeds a defined threshold.

Determining if the defined property exceeds a defined threshold, by the processor, may include: measuring at least one of the following: relative intensity of the edge and adjacent background; length of the edge; distance of the edge from a centroid of the associated paddy grain; angle of the edge relative to a longitudinal axis of the associated paddy grain; and position of the edge relative to a mid-point of the longitudinal axis; and comparing the at least one measured value to the defined threshold.

Responsive to identifying any crack defined by the paddy grains, the processor may be configured to determine an output value relating to grain quality.

The processor may be further configured such that responsive to receiving the first image and the second image, the processor combines the images to obtain a third image and, responsive to obtaining the third image, determine a maturity of the paddy grains represented in the third image.

The processor may be configured such that determining the maturity of the paddy grains includes the processor determining at least one of an opacity value and a colour value defined by the paddy grains represented in the third image.

Responsive to identifying any crack defined by the paddy grains, and the maturity of the paddy grains, the processor may be configured to determine an output value.

In an embodiment, there is provided a method for assessing a paddy grain. The method includes: illuminating the paddy grain to cause light to be transmitted through the grain in a first direction, and simultaneously capturing a first image of the paddy grain; illuminating the paddy grain to cause light to be transmitted through the grain in a second direction opposite to the first direction, and simultaneously capturing a second image of the paddy grain; and processing the first image and the second image to identify any crack defined by the paddy grain.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

It will be appreciated embodiments may comprise steps, features and/or integers disclosed herein or indicated in the specification of this application individually or collectively, and any and all combinations of two or more of said steps or features.

BRIEF DESCRIPTION OF DRAWINGS

Embodiments will now be described by way of example only with reference to the accompany drawings in which.

DESCRIPTION OF EMBODIMENTS

Figure 1:
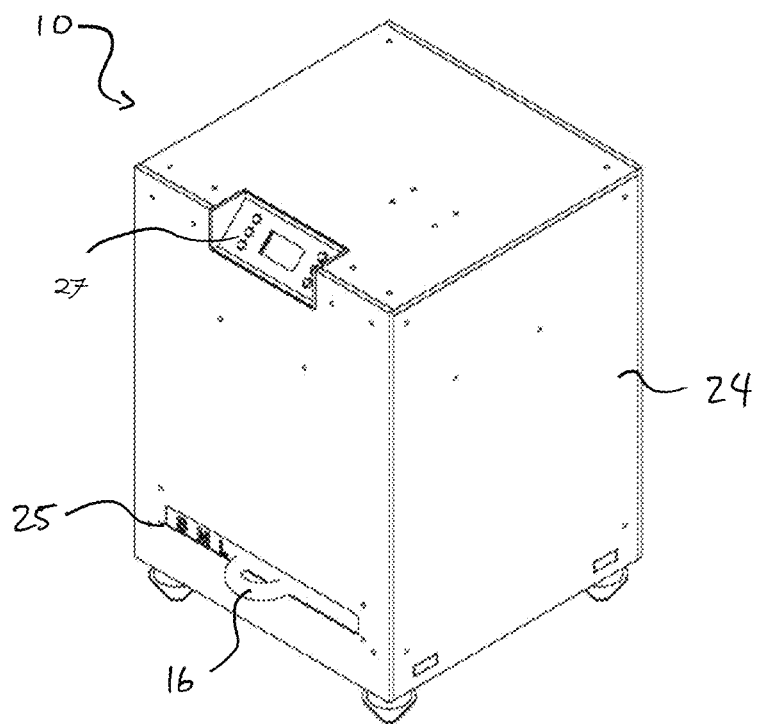
FIG. 1 is an isometric view of an apparatus for assessing paddy grains.

In the drawings, reference numeral 10 generally designates an apparatus 10 for assessing paddy rice grains. The apparatus 10 includes: a light source 12; a camera 14 secured in a fixed position spaced from the light source 12; and a grain tray 16 mountable between the light source 12 and the camera 14. The grain tray 16 defines a plurality of elongate openings 18, each opening 18 defining opposed ends 20, 22 and being dimensioned to receive a paddy rice grain between the ends 20, 22. The light source 12 is operable in a first mode to illuminate one end 20 of at least some of the openings 18 of the grain tray 16, and operable in a second mode to illuminate the opposed end 22 of the at least some of the openings 18. In each mode, the light source 12 transmits light through the at least some of the openings 18 and towards the camera 14. The camera 14 is operable to capture a first image of the at least some of the openings 18 simultaneously with the light source 12 being operated in the first mode, and a second image of the at least some of the openings 18 simultaneously with the light source 12 being operated in the second mode.

Figure 2:
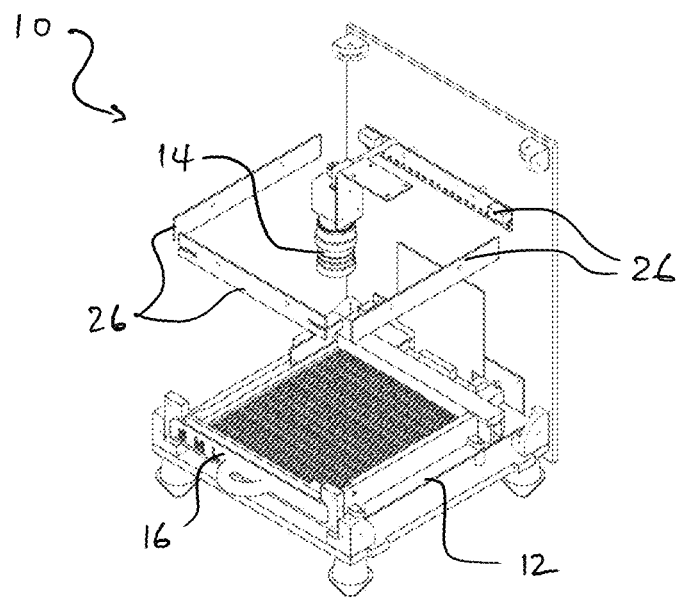
FIGS. 2 to 4 are isometric views of the apparatus shown in FIG. 1 in stages of partial disassembly.
Figure 3:
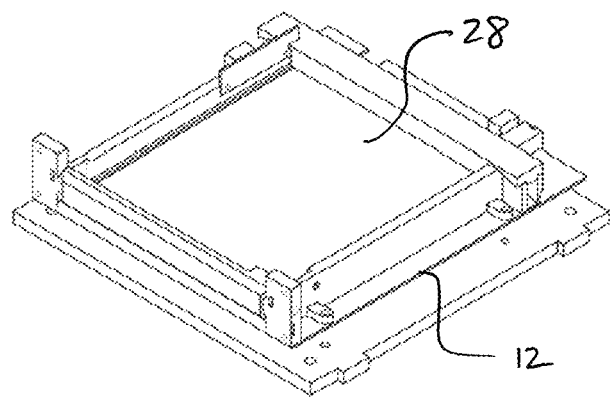
Figure 4:
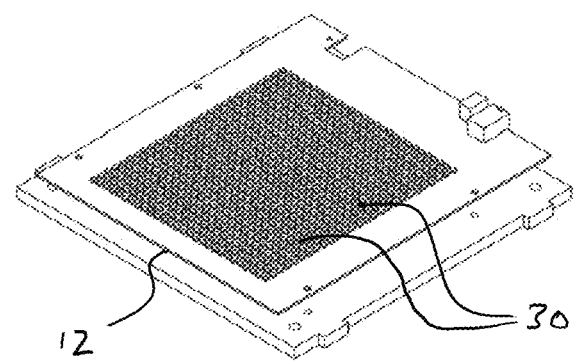

FIG. 1 illustrates the apparatus 10 in an assembled state and FIGS. 2 to 4 illustrate the apparatus 10 in partially disassembled states.

FIG. 1 illustrates a housing 24 to which a control and display panel 27 is mounted. The housing 24 defines a slot 25 dimensioned to receive the grain tray 16. FIG. 2 illustrates the apparatus 10 with the housing 24 removed to expose the camera 14 and the grain tray 16. A second light source, in the form of four linear LED arrays 26, are arranged proximally to and surrounding the camera 14. The linear arrays 26 are operable to illuminate an operatively upper side of the grain tray 16.

In the illustrated embodiment, the camera 14 is configured as a frame camera and lens assembly. The camera 14 is operable to capture an image (frame) of the plurality of openings 18 defined by the grain tray 16 in less than a second, and typically in a fraction of a second. Minimising the period of time required to capture the images is useful as this affects the time required to assess the paddy grains. During a busy harvest, the apparatus 10 may be required to assess ten or more samples of paddy grains each hour, often whilst the grain grower is waiting for the results.

The camera 14 is shown mounted operatively above the grain tray 16 and the light source 12. This inhibits dust on the grain affecting the images captured by the camera 14. In other embodiments (not illustrated), the apparatus 10 is configured so that the grain tray 16 is orientated vertically and the camera 14 is spaced horizontally from the grain tray 16. In such embodiments the grain tray 16 optionally includes a retention mechanism configured to retain the paddy grains in the openings 18. The retention mechanism may include a cover securable across the openings 18, and/or a vacuum source operable to draw air into the openings 18.

FIGS. 3 and 4 show the apparatus with the camera 14 and the grain tray 16 removed to expose a diffuser plate 28 (FIG. 3) and the light source 12, in this embodiment configured as an array of light emitting units, in the form of LEDs 30. However, it will be appreciated that alternative lighting units are within the scope of this disclosure. The LEDs 30 are arranged in a grid array and configured to be alternately operated in two groups. The diffuser plate 28 is a translucent sheet which causes diffusion of light emitted from the LEDs 30.

Figure 5:
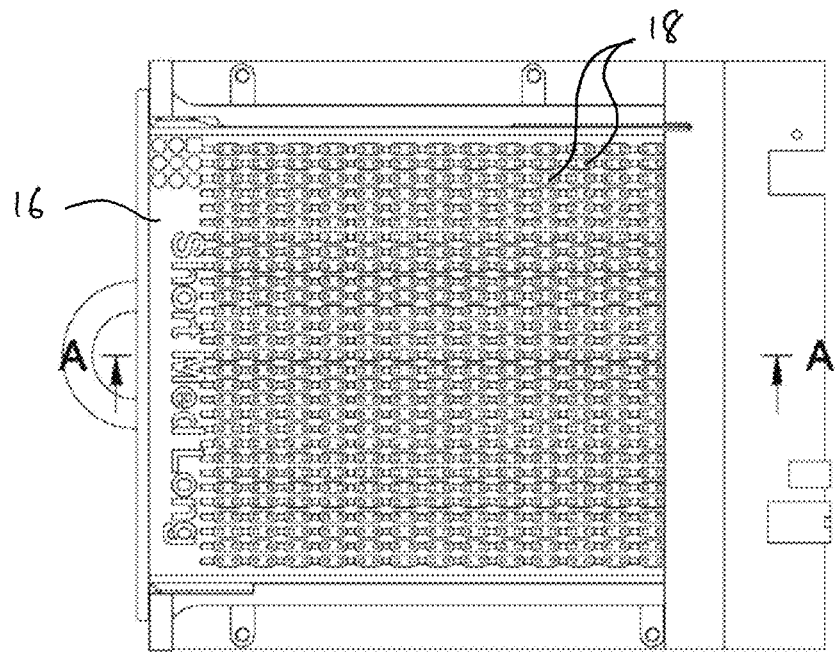
FIG. 5 is a cross-section plan view of the apparatus as shown in FIG. 2.
Figure 6:
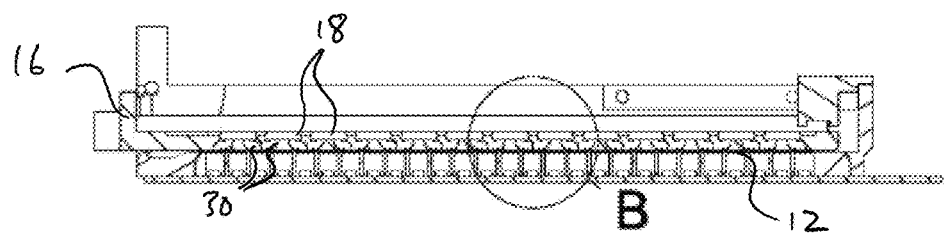
FIG. 6 is a cross-section side view taken along line A-A in FIG. 5.
Figure 7:
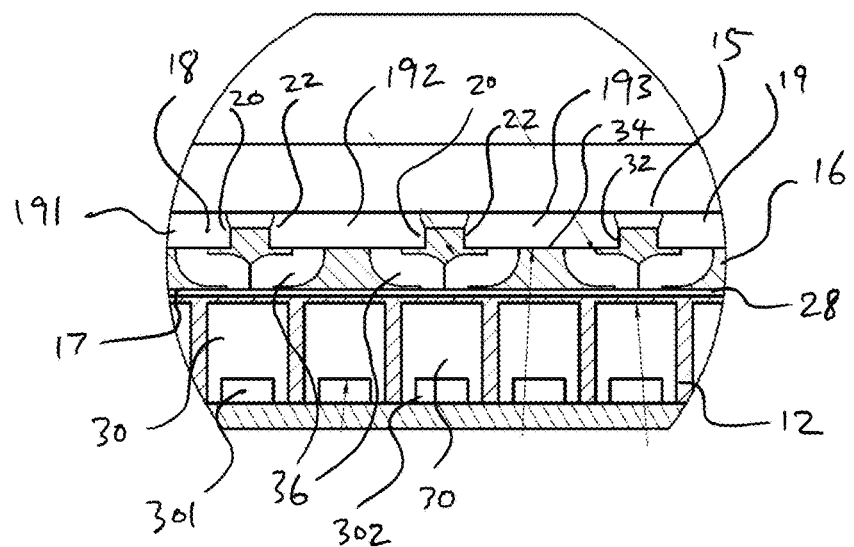
FIG. 7 is an enlarged, detail view of circle B in FIG. 6.

FIGS. 5 to 7 show the arrangement of the grain tray 16 relative to the array of LEDs 30 in detail. In the illustrated embodiment, the grain tray 16 is separate from, and mountable relative to, the array of LEDs 30. In other embodiments (not illustrated), the LEDs 30 are secured to the grain tray 16.

FIG. 5 illustrates the plurality of openings 18 which are arranged in a complementary grid array to the array of LEDs 30. The tray 16 is configured to be mounted relative to the LEDs 30 such that each opening 18 is aligned with a pair of the LEDs 30. One LED 30 of each pair is from the first group and the other LED 30 of each pair is from the second group. This means that operating the first group of LEDs 30, in the first mode, causes illumination of one end 20, 22 of each opening 18, and operating the second group of LEDs 30, in the second mode, causes illumination of the other end 20, 22 of each opening 18. This arrangement consequently focuses light emitted from the LEDs 30 to be at, or close to, the end 20, 22 of the openings 18 which can enhance light transmission through a paddy grain contained in any opening 18.

Best shown in FIG. 7, in the illustrated embodiment the openings 18 are configured as recesses 19 defined in an operatively top side 15 of the grain tray 16. Each recess 19 has at least one sidewall 32 and a base surface 34, and is configured to receive a paddy grain to be supported on the base surface 34. In other embodiments (not illustrated), the grain tray 16 is configured such that the openings 18 are apertures extending through the tray 16. In such embodiments, the paddy grains are receivable in the openings 18 and supported on the diffuser plate 28, or, in some embodiments, supported directly on the LEDs 30. In these alternative embodiments, the LEDs 30 are housed to prevent light transmission between the pairs, and to focus emitted light only at the ends 20, 22 of the openings 18 to focus the light at one end of a paddy grain contained in an opening 18. The apparatus 10 may also include or be associated with gas emission means, such as a jet operable to release pressurised air, to allow removing dust or debris from the LEDs 30 or the diffuser plate 28.

Also shown in FIG. 7, the grain tray 16 defines a plurality of light tunnels 36, being conduits for conveying light. Each light tunnel 36 extends from one of the recesses 19 to an operatively bottom side 17 of the tray 16. The light tunnels 36 are arranged in pairs, and each pair is associated with one of the recesses 19. When mounted relative to the array of LEDs 30, each tunnel 36 is arranged to convey light emitted by one of the LEDs 30 to the associated recess 19.

In the illustrated embodiment, each light tunnel 36 is defined in the base surface 34 of the associated recess 19 and arranged to be adjacent to, but spaced from, one of the ends 20, 22. The spacing of the tunnel 36 from the adjacent end 20, 22 is defined so that light emitted from the tunnel 36 bypasses the ends of the hull of a paddy grain contained in the recess to cause transmission of the light through a rice grain encased within the hull.

Each light tunnel 36 is configured to extend away from the associated base surface 34 and immediately bend, in this embodiment, to form a right angle. This arrangement causes light transmitted through the tunnel 36 to reflect in a scattered pattern off the bend. This usefully diffuses the light which inhibits 'flaring' in the images captured by the camera 14. For example, flaring could occur if a recess 19 does not contain a paddy grain, or the grain is misaligned with the recess 19 such that the tunnel 36 is uncovered, when the image is captured. It will be appreciated that a flare in photography refers to an undesirable haze in an image which can distort the image, thereby obstructing details. It will also be appreciated that transmitting light through paddy grains with the apparatus 10, as described in greater detail below, requires high intensity light to penetrate the hull of the paddy grain and/or bypass the embryo of the rice grain. Such light intensities exacerbate the potential for flaring in the captured images.

Each light tunnel 36 is configured such that after the bend, the tunnel 36 extends parallel to the base surface 34 and past the adjacent end 20, 22 of the recess 19. This arranges the pair of light tunnels 36 associated with one of the recesses 19 to be opposed from each other such that light travelling through each tunnel 36 is directed substantially towards a centre of the associated recess 19. This arrangement also allows merging of the tunnels 36 from adjacent pairs at junctions which open out to the operatively lower side 17 of the grain tray 16. This allows illuminating two tunnels 36 connected to two adjacent recesses 19 with a single LED 30.

Best shown in FIG. 7, the arrangement of the light tunnels 36 allows operating LED 301, as part of the first group of LEDs 30, to illuminate the first end 20 of recess 191 and the second end 22 of the adjacent recess 192 simultaneously. Subsequently operating LED 302, as part of the second group of LEDs 30, illuminates the second end 22 of recess 191 and the first end 20 of the adjacent recess 193 simultaneously. Configured the light tunnels 36 in this way consequently limits the number of LEDs required to illuminate the ends 20, 33 of the recesses 19.

In other embodiments (not illustrated), each light tunnel 36 is configured as a linear tube extending at an oblique angle relative to the base surface 34 to be directed towards a centre of the associated recess 19. This arrangement allows directing light across a longitudinal axis, and towards a centre, of a paddy grain contained in the recess 19.

In yet other embodiments (not illustrated), the grain tray 16 defines second light tunnels arranged to extend between the sidewall 32 of the recesses 19 and the operatively lower side 17 of the tray 16. In such embodiments transmitting light through the second tunnels allows illuminating each side of the associated recess 19 simultaneous with capturing a further image of the recesses 19. Assessing this further image, in combination with the first and second images, may inhibit identifying false positives, such as incorrectly identifying edges defined by the embryo of the rice grain as a crack in the grain.

The geometry of the light tunnels 36 is defined according to the intensity and localisation of illumination of the paddy grain which is required. Exposing the paddy grain to non-localised light results in cracks in the rice grain being less distinct and consequently difficult to identify.

Figure 8:
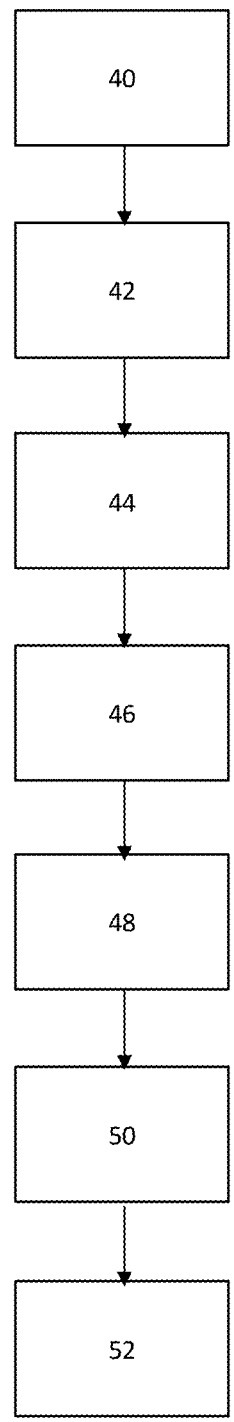
FIG. 8 is a flow chart illustrating stages of operating the apparatus shown in FIGS. 1 to 7.

FIG. 8 illustrates stages of operation of the apparatus 10 to assess paddy grains. In the described embodiments, assessing the grains causes a whole grain yield value estimation to be generated. It will be appreciated that assessing the grains, by operating the apparatus 10, also allows determining other values or properties relating to grain quality.

Assessment of the grains is performed by a processor (not illustrated) executing an algorithm defined in an application. In some embodiments, the processor is a component of the apparatus 10. In other embodiments, the processor is remotely hosted. Where the processor is remotely hosted, the apparatus 10 includes a communications module (not illustrated) configured to communicate images captured by the camera 14 to the processor, for example, via the Internet.

Initially, at stage 40, a sample of paddy grains are arranged by a user in the recesses 19 of the grain tray 16, and the grain tray 16 is inserted into the slot 25 to be mounted between the array of LEDs 30 and the camera 14.

Figure 9:
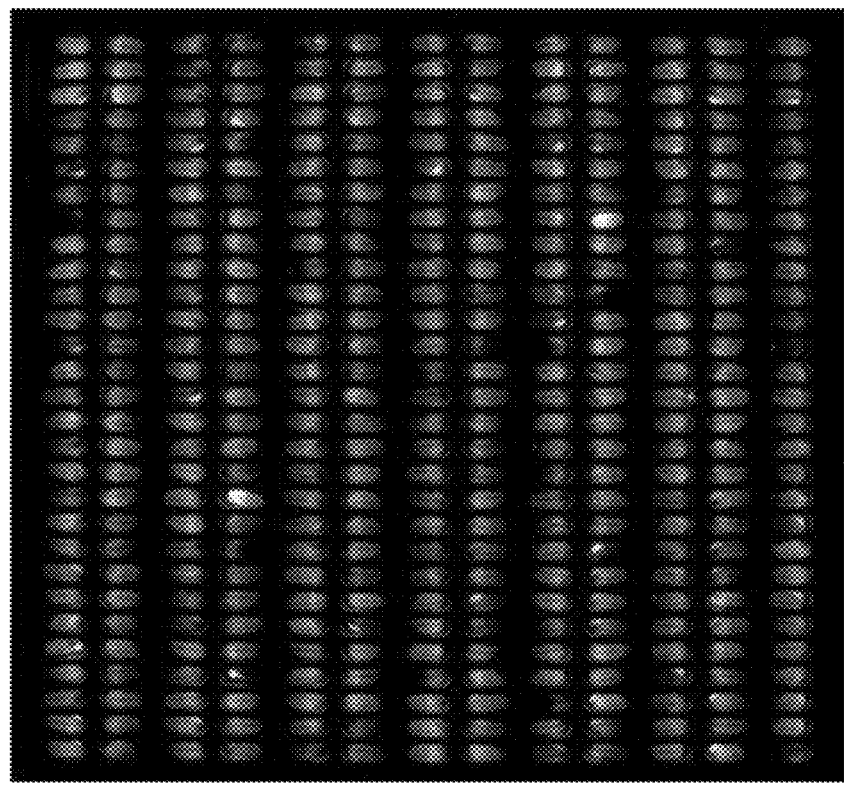
FIGS. 9 to 12 are examples of images captured by the apparatus shown in FIGS. 1 to 7.
Figure 10:
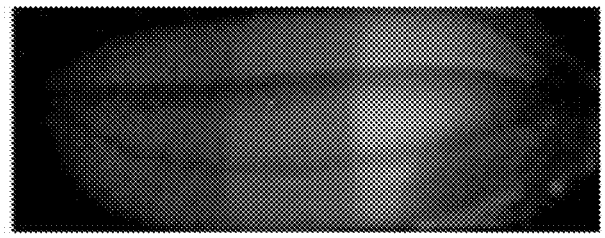

At stage 42, the LEDs 30 are operated in the first mode, causing operation of the first group of LEDs 30, to illuminate one of the ends 20, 22 of each recess 19. This causes light to be transmitted through the each of the paddy grains contained in the recesses 19 in a first direction. Simultaneously, the camera 14 is operated to capture a first image of the recesses 19. The first image captures transmission of light in the first direction through the grains to form a light gradient across the grains which decreases in intensity in the first direction. An example of the first image is shown in FIG. 9 and a detail view showing a single grain represented in the first image is shown in FIG. 10.

Figure 11:
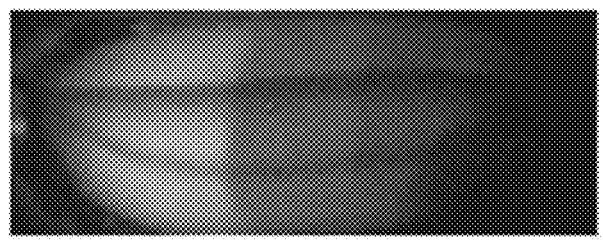

At stage 44, the LEDs 30 are operated in the second mode, causing operation of the second group of LEDs 30, to illuminate the other end 20, 22 of each recess 19. This causes light to be transmitted through each of the paddy grains contained in the recesses 19 in a second direction which is opposite to the first direction. Simultaneously, the camera 14 is operated to capture a second image of the recesses 19. The second image captures transmission of light in the second direction through the grains to form a light gradient across the grains which decreases in intensity in the second direction. An example detail view showing a single grain represented in the second image is shown in FIG. 11.

Figure 12:
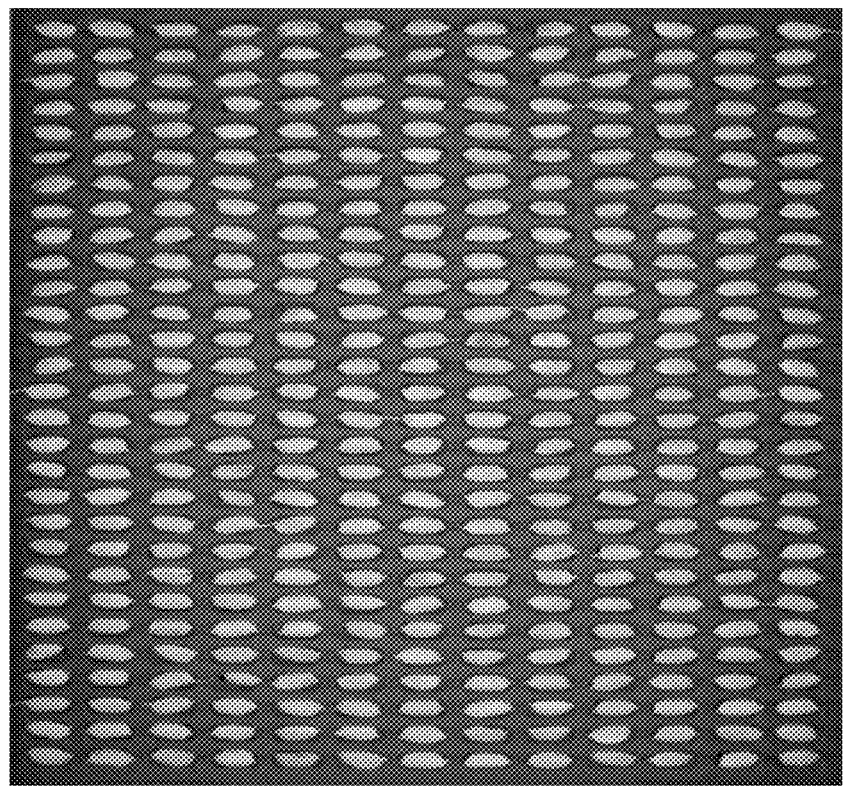

At stage 46, the linear LED arrays 26 are operated to illuminate the operatively top side 15 of the grain tray 16. Simultaneously, the camera 14 is operated to capture a third image of the recesses 19. The third image captures light reflected off the paddy grains contained in the recesses 19. An example of the third image is shown in FIG. 12.

At stage 48, the first image, second image and third image are communicated to the processor. The processor is configured by the application such that, responsive to receiving the first image and the second image, the processor assesses the images to identify any crack defined by any of the paddy grains represented in the first image and the second image, as described in greater detail below. Typically, the processor is also configured to assess the third image to enhance crack detection, also described in greater detail below.

Figure 13:
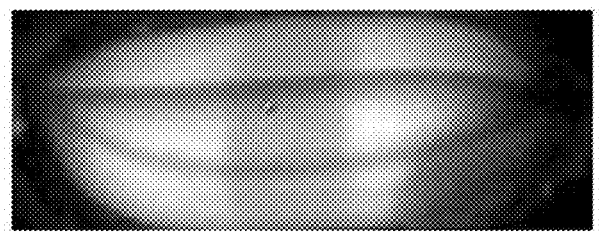
FIG. 13 is an example of an image generated from processing the images captured by the apparatus shown in FIGS. 1 to 7.

At stage 50, the processor combines the first image and the second image to obtain a fourth image, and assesses the fourth image to determine at least one of an opacity value and a colour value for each of the paddy grains represented in the image. Optionally, the processor also assesses the third image to determine the colour value. Responsive to determining the opacity value and/or the colour value, the processor determines a maturity value of each of the paddy grains represented in the images. An example detail view showing a single grain represented in the fourth image is shown in FIG. 13.

At stage 52, the processor determines an output value relating to grain quality. The output value is based on at least one of the quantity of cracks identified in, and maturity value of, the paddy grains represented in the images, as described in greater detail below. For example, the output value may be a breakage score relating to the likelihood of a grain breaking during milling, where a grain is assigned a score corresponding with the number of cracks identified, e.g. zero cracks results in a score, of 0, one crack is results in a score of 1, and so on. This means that a high scoring sample of grains indicates a high likelihood of grain breakage, and consequently a low whole grain yield, and vice versa.

Typically, the output value is an estimation or determination of whole grain yield (WGY). Alternatively or additionally, the output value is a milling resistance categorisation which indicates how resistant the grains are to milling without breaking. Categorising or grading the grains in this way allows grain lots to be sorted according to milling resistance, consequently assisting millers to select appropriate milling parameters which can enhance milling efficiency.

Estimating WGY may involve supervised machine learning. In such embodiments, at stage 52, the processor is configured to operate a regression computer model trained using a collection of data obtained from operating the apparatus 10 to assess paddy samples, and WGY data obtained after milling the same samples. This model is typically configured to combine a classification model trained to estimate the number of cracks in grains, together with a model trained to estimate immaturity level of grains.

Figure 14:
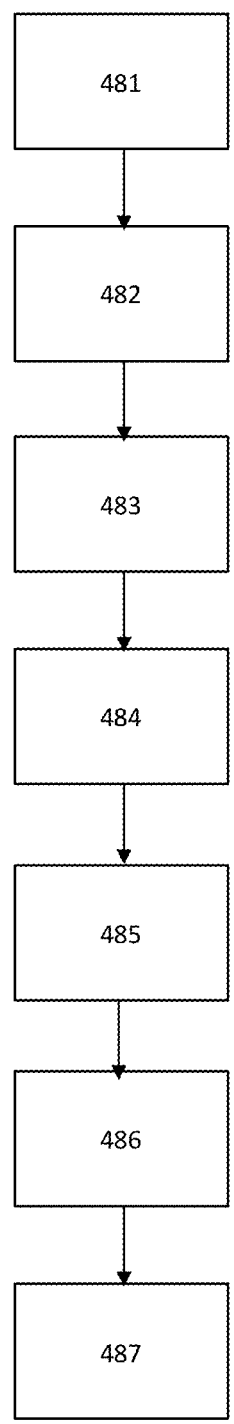
FIG. 14 is a flow chart illustrating stages of processing the images captured by the apparatus shown in FIGS. 1 to 7 to identify any crack in the grains represented in the images.

FIG. 14 illustrates sub-stages of identifying a crack in any of the paddy grains represented in the images at stage 48 of FIG. 8. Identifying cracks in paddy grains is a prominent indicator of whether the grain will survive forces exerted on it during de-hulling, to remove the hull, and potentially also polishing, to remove the bran layer, without breaking. Broken grains are considered unsaleable in premium products and are generally only sold as a percentage of a low value product or as stockfeed, and consequently are undesirable. An unacceptably broken grain is defined as a grain defining a length (along a longitudinal axis between opposed ends of the grain) of less than 75% of the length of an average grain for the relevant variety. It will be appreciated that identifying cracks in grains can significantly influence accurate estimation of whole grain yield.

The sub-stages illustrated in FIG. 14 involve detecting edges in the first image and the second images, and comparing each edge to reference data to determine if the edge relates to a crack in the grain. The reference data in this embodiment includes predetermined threshold values defined to allow qualifying a crack which would allow unacceptable grain breakage. The threshold values are determined manually responsive to measuring sample grains, and/or by a machine learning algorithm trained on measured grain data. The processor is configured, by the application, to determine whether a property of the edge exceeds one or more of the threshold values. A positive determination then causes the processor to identify the edge as corresponding with a crack. It will be appreciated that the illustrated sub-stages are exemplary and that alternative approaches to identify and assess an edge in an image is within the scope of this disclosure.

Figure 15:
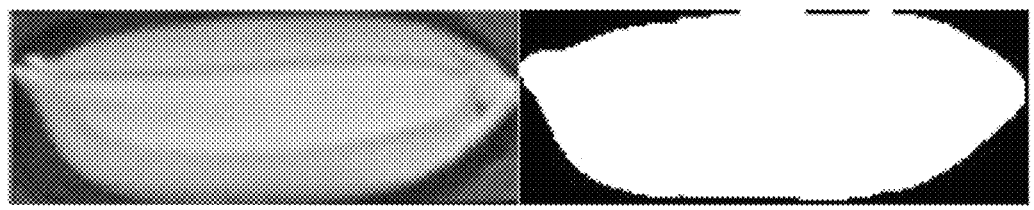
FIGS. 15 to 19 are examples of images generated from processing the images captured by the apparatus shown in FIGS. 1 to 7.

At sub-stage 481, the processor processes the third image to form a binary mask of the grains represented in the image. An example detail view of the third image and resulting binary mask is shown in FIG. 15. To form the binary mask each pixel of the third image is assessed, by the processor, to determine whether the pixel exceeds a defined intensity threshold and, consequently, is assigned a binary value such that a pixel is set to white if its intensity value is greater than or equal to the threshold, or the pixel is set to black it its intensity value is less than the threshold. The processor then applies the binary mask to each of the first image and the second image to allow confining analysis to a single grain in the image.

Figure 16:
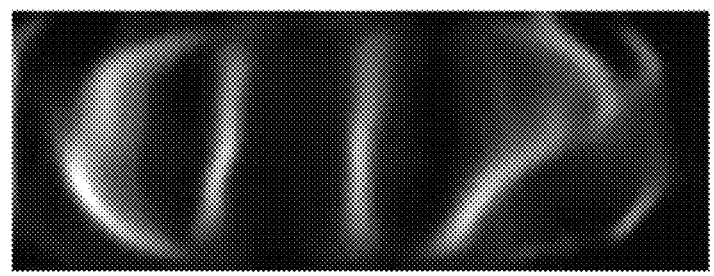

At sub-stage 482, the processor smooths each of the first image and the second image, typically by applying a linear smoothing filter in the vertical direction, so that horizontally extending edges, which relate to the outline of the hull, are effectively removed from the images while vertically extending edges, which generally relate to cracks, remain visible. The processor then determines the light gradient across each grain in each of the first image and the second image typically by convolving the image with an edge detection kernel, or, alternatively, computing the derivative in the horizontal direction. The processor then combines the first image and the second image together to form an edge map of each grain. An example of the edge map relating to a single grain is shown in FIG. 16.

At sub-stage 483, the processor enhances the edge map, for example, by applying a phase symmetry filter, and applies a second mask, derived from the binary mask, to crop the ends of the grain from the image. The edges near to an end of the grain are excluded from further analysis as these edges typically relate to the hull and not to any cracks.

Figure 17:
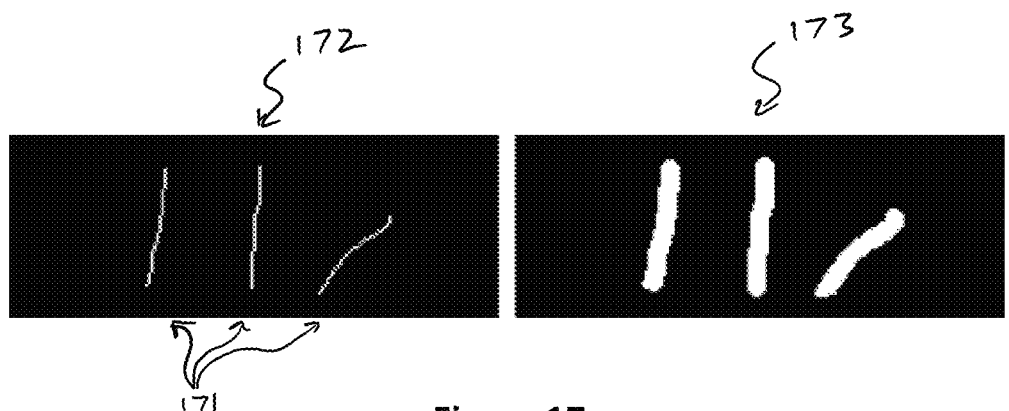

At sub-stage 484, the processor binarizes the enhanced edge map to define single pixel-width edges 171 in a pixel-width edge map 172, and morphologically dilates the edges to form a third mask 173 configured to confine further analysis of the image to crack candidate regions which the processor has determined likely relate to a crack. An example of the single pixel-width edge map 172 and resulting third mask 173 is shown in FIG. 17.

Figure 18:
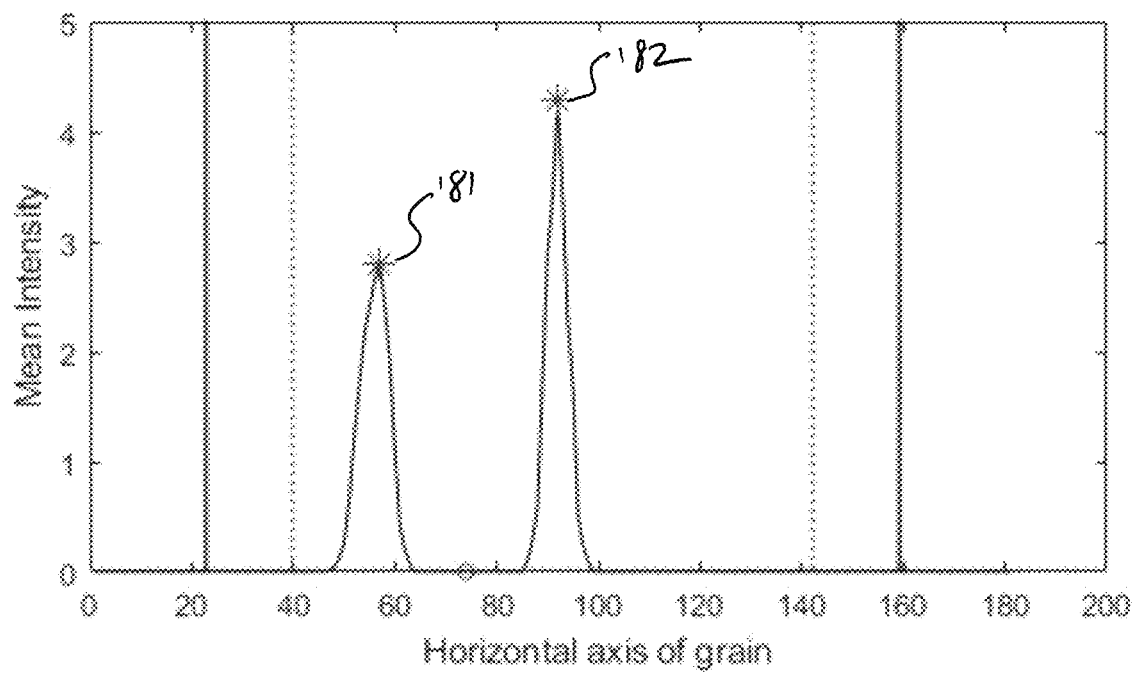

At sub-stage 485, the processor plots the average pixel intensity of each column of pixels in the edge image 172 falling within the crack candidate regions demarcated by the third mask 173. An example plot is shown in FIG. 18 having two peaks 181, 182 marking the positions of candidate crack regions, corresponding with the left and centre edges 171 shown in the edge map 172, each marked with an asterisk. A smaller peak marking the position of the embryo of the grain, corresponding with the right edge 171 shown in the edge map 172, is excluded from the plot by applied thresholds and is not shown. The embryo is typically denser than the endosperm which means that when light is transmitted through the grain the embryo can cause an edge to be detected.

Figure 19:
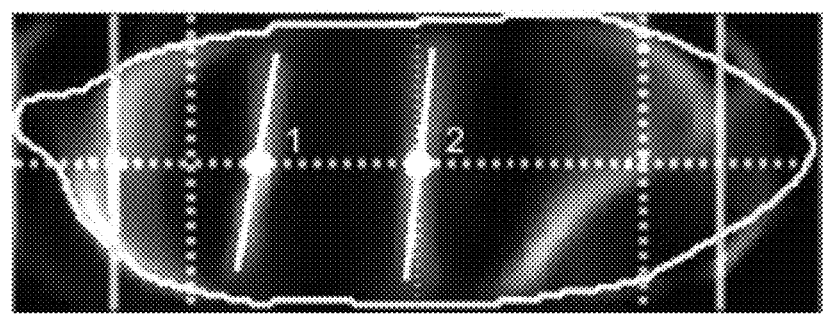

At sub-stage 486, the processor measures properties of the edge within each defined candidate crack region. The measured properties include difference in intensity between the edge and background (or, in other words, the relative intensity of the edge compared to the adjacent background), length of the edge, distance of the edge from a centroid of the grain, angle of the edge relative to a longitudinal axis of the grain, and position of the edge relative to a mid-point of the longitudinal axis. An example of the analysed image is shown in FIG. 19.

At sub-stage 487, the processor determines if any of the measured values exceed the relevant predetermined threshold value. For example, responsive to determining an edge is within 25 degrees of perpendicular to the longitudinal axis, extending entirely across the grain, and is positioned less than 25% of the length of the grain away from each grain end, the processor positively identifies the edge as a crack. The processor then classifies the grain according to likelihood to break during milling, for example, by assigning a breakage score as described above.

Figure 20:
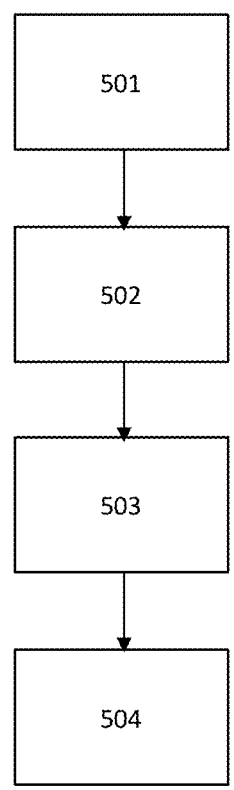
FIG. 20 is a flow chart illustrating stages of processing the images captured by the apparatus shown in FIGS. 1 to 7 to determine maturity of grains represented in the images.

FIG. 20 illustrates sub-stages of determining the opacity and colour value of each the paddy grains in the image captured at stage 46 (FIG. 8) and shown in FIG. 12. Identifying opacity and/or colour of the grain is a prominent indicator of grain maturity. Immature grains often have 'chalkiness' present in the endosperm, meaning that at least a portion of the rice grain is substantially opaque, the grain may define a substantially shorter length than the average grain length for the variety, and/or the grain may be green. When a grain is excessively immature it will typically not survive forces exerted on it during milling without breaking. It will be appreciated that determining grain maturity can also influence the accuracy of estimating whole grain yield. It will also be appreciated that the illustrated sub-stages are exemplary and that alternative approaches to determine opacity and/or colour of the grains in any of the images captured by the camera 14 is within the scope of this disclosure.

At sub-stage 501, the processor applies a colour reference target to white balance the first image, second image and third image.

At sub-stage 502, the processor converts each image to CIE L*a*b* colour space values.

At sub-stage 503, the processor defines a feature vector for each grain represented in the images based on: average light intensity; colour; and grain size.

At sub-stage 504, the processor classifies each grain by comparing the feature vector to a calibrated set of feature vectors. The comparison typically involves operating a classification model. This allows the processor to determine if the grain is mature. This may cause, for example, categorising the grains according to maturity class, such as 'mature class' (not likely to break during milling) or 'immature class' (likely to break).

During milling of paddy, which includes de-hulling to brown grain and polishing to white grain, rice grains can be broken by forces exerted on the grains during these processes. This means that estimating cracks in de-hulled or polished grains does not reliably allow an accurate estimate of whole grain yield to be determined. Conversely, assessing unprocessed paddy grains with the apparatus 10 allows cracks in the paddy to be accurately identified and, consequently, whole grain yield to be accurately estimated. The apparatus 10 therefore allows timely estimates of grain quality to be acquired which, in turn, avoids the potentially misleading physical effects of milling processes, and variability caused by de-huller and polishing machines.

Operating the apparatus 10 accurately identifies cracks in paddy grains contained in the grain tray 16 due to capturing the first and second images of the grains to represent the grains being illuminated from each end. Transmitting light through the grains in this way causes the light to reflect off cracks. The reflected light is captured in the first and second images. The images are then processed to allow identification of cracks. This process is rapidly executed allowing many samples of paddy grains to be assessed in each hour of operating the apparatus 10. This allows whole grain yield to be estimated for a harvested crop in a short time period, typically requiring less than 5 minutes per assessed sample of paddy grains.

The apparatus 10 is configured to assess harvested paddy grains. This allows for accurate estimation of WGY of a sample of grains to be determined at a testing stand located at a point of delivery for the harvested paddy grains. Operation of the apparatus 10 therefore allows rapid determination of grain quality prior to any processing, such as drying or milling. Consequently, timely and accurate feedback on grain quality can be provided to growers, in addition to determining pricing for the grain, and payment to the grower, at the point of delivery.

Operating the apparatus 10 allows an accurate assessment and grading of grain quality to be acquired prior to milling. This in turn allows optimising milling parameters for the graded lot, enhancing milling efficiency, reducing risk and waste, and mitigating further grain processing.

The apparatus 10 avoids any physical processing of the paddy grains during the assessment process. This negates any potential differences between milling apparatus which can differ significantly between mills and laboratories, providing an accurate baseline assessment of rice quality.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. An apparatus for assessing paddy rice grains, the apparatus including:
    a light source;
    a camera secured in a fixed position; and
    a grain tray mountable between the light source and the camera, the grain tray defining a plurality of elongate openings, each opening defining opposed ends and being dimensioned to receive a paddy grain between the ends,
    the light source including an array of light emitting units configured to be alternately operated in a first group or in a second group, and
    the grain tray configured to be secured relative to the array such that each opening is aligned with one light emitting unit of the first group and one light emitting unit of the second group,
    whereby the first group of light emitting units are operable to illuminate one end of at least some of the openings of the grain tray, and the second group of light emitting units are operable to illuminate the opposed end of the at least some of the openings, where operating each group of light emitting units transmits light through the at least some of the openings and towards the camera, and
    the camera being operable to capture a first image of the at least some of the openings simultaneously with the operating in the first group of light emitting units, and capture a second image of the at least some of the openings simultaneously with operating the second group of light emitting units.

2. The apparatus of claim 1, wherein the grain tray defines opposed sides, and each opening is a recess defined in one of the sides, and the grain tray further defines a plurality of light tunnels arranged in pairs, each pair associated with one of the recesses and arranged to extend from the associated recess to the other side of the grain tray.

3. The apparatus of claim 2, wherein each recess defines a base surface extending between the ends, and the associated light tunnels are defined in the base surface.

4. The apparatus of claim 3, wherein each light tunnel is arranged adjacent to and spaced from one of the ends of the associated recess.

5. The apparatus of claim 3, wherein each light tunnel defines a bend adjacent the base surface.

6. The apparatus of claim 1, wherein the camera is secured operatively above the light source.

7. The apparatus of claim 1 including a second light source arranged proximally to the camera to allow illuminating the grain tray.

8. A system for assessing paddy rice grains, the system including:
    a tray defining a plurality of openings configured to support the paddy grains;
    a light source arranged to transmit light through the paddy grains supported by the tray, the light source including an array of light emitting units configured to be alternately operated in a first group or in a second group, the array arrangeable relative to the tray such that each opening is aligned with one light emitting unit of the first group and one light emitting unit of the second group,
    whereby the first group of light emitting units are operable to cause light to be transmitted through the grains in a first direction, and the second group of light emitting units are operable to cause light to be transmitted through the grains in a second direction opposite to the first direction;
    a camera secured relative to the light source to allow capturing images of the paddy grains supported by the tray, the camera operable to capture a first image of the paddy grains simultaneously with the operating the first group of light emitting units, and capture a second image of the paddy grains simultaneously with operating the second group of light emitting units; and
    a processor communicatively coupled with the camera, and configured such that, responsive to receiving the first image and the second image, the processor is configured to identify a crack defined by any of the paddy grains represented in the first image and the second image.

9. The system of claim 8, wherein the processor is configured such that identifying a crack includes detecting edges defined by at least one of the first image and the second image, and determining if the edge relates to a crack.

10. The system of claim 9, wherein the processor is configured such that determining if the edge relates to a crack includes the processor determining if the edge defines a property which exceeds a defined threshold.

11. The system of claim 10, wherein determining if the defined property exceeds a defined threshold includes:
    measuring at least one of: relative intensity of the edge and adjacent background; length of the edge; distance of the edge from a centroid of the associated paddy grain; angle of the edge relative to a longitudinal axis of the associated paddy grain; and position of the edge relative to a mid-point of the longitudinal axis; and
    comparing the at least one measured property to the defined threshold.

12. The system of claim 8, wherein responsive to identifying any crack defined by the paddy grains, the processor is configured to determine an output value relating to grain quality.

13. The system of claim 8, wherein the processor is further configured such that responsive to receiving the first image and the second image, the processor combines the images to obtain a third image and, responsive to obtaining the third image, determine a maturity of the paddy grains represented in the third image.

14. The system of claim 13, wherein the processor is configured such that determining the maturity of the paddy grains includes the processor determining at least one of an opacity value and a colour value defined by the paddy grains represented in the third image.

15. The system of claim 14, wherein responsive to identifying any crack defined by the paddy grains, and the maturity of the paddy grains, the processor is configured to determine an output value.

16. A method for assessing a paddy rice grain, the method including:
- arranging the paddy rice grain in an opening defined by a tray mounted relative to an array of light emitting units configured to be alternately operated in a first group or in a second group, where the opening is aligned with one light emitting unit of the first group and one light emitting unit of the second group;
- operating the first group of light emitting units to illuminate the paddy rice grain to cause light to be transmitted through the grain in a first direction, and simultaneously capturing a first image of the grain;
- operating the second group of light emitting units to illuminate the paddy rice grain to cause light to be transmitted through the grain in a second direction opposite to the first direction, and simultaneously capturing a second image of the grain; and
- processing the first image and the second image to identify any crack defined by the paddy rice grain.

\* \* \* \* \*